US011178053B2

(12) United States Patent
Miu et al.

(10) Patent No.: US 11,178,053 B2
(45) Date of Patent: Nov. 16, 2021

(54) NETWORK SYSTEMS AND ARCHITECTURE FOR SCALING ACCESS NETWORKS WITH NETWORK ACCESS CONTROLLER

(71) Applicant: Frontiir PTE Ltd, Singapore (SG)

(72) Inventors: Allen Ka Lun Miu, Fremont, CA (US); Myo Min Htun, Yangon (MM); Min Htut Win, Yangon (MM); Paing Hein Thu, Yangon (MM); Tay Zar Lwin, Yangon (MM); Tin Aung Lin, Yangon (MM); Tun Tun Myint, Yangon (MM); Phyo Kyi Thein, Yangon (MM); Godfrey Tan, San Jose, CA (US)

(73) Assignee: Frontiir PTE Ltd., Singapore (SG)

(*) Notice: Subject to any disclaimer, the term of this patent is extended or adjusted under 35 U.S.C. 154(b) by 252 days.

(21) Appl. No.: 15/905,655

(22) Filed: Feb. 26, 2018

(65) Prior Publication Data
US 2019/0124001 A1    Apr. 25, 2019

Related U.S. Application Data

(60) Provisional application No. 62/576,505, filed on Oct. 24, 2017.

(51) Int. Cl.
*H04L 12/721* (2013.01)
*H04L 12/741* (2013.01)
*H04L 29/06* (2006.01)

(52) U.S. Cl.
CPC .............. *H04L 45/74* (2013.01); *H04L 63/08* (2013.01); *H04L 63/0876* (2013.01)

(58) Field of Classification Search
CPC ......... H04L 45/72; H04L 45/74; H04L 63/08; H04L 63/0876
See application file for complete search history.

(56) References Cited

U.S. PATENT DOCUMENTS

| 7,295,552 B1* | 11/2007 | Kadambi | ............ H04L 12/4645 |
| | | | 370/392 |
| 7,796,590 B1* | 9/2010 | Melman | .................. H04L 45/02 |
| | | | 370/389 |
| 8,514,828 B1* | 8/2013 | Verma | ................. H04L 12/4633 |
| | | | 370/338 |

(Continued)

*Primary Examiner* — Khaled M Kassim
(74) *Attorney, Agent, or Firm* — Womble Bond Dickinson (US) LLP

(57) ABSTRACT

Network architecture with network access controllers. In one embodiment, a method is disclosed. The method includes receiving a packet from a client device via an ingress network interface, wherein the packet comprises a first medium access control (MAC) address indicating a default network access controller. The method also includes identifying a source MAC address of the packet, wherein the source MAC address indicates a second MAC address of the client device. The method further includes identifying a second network access controller based on the source MAC address. The method further includes updating, by a packet forwarding component, a destination MAC address to indicate a third MAC address of the second network access controller. The method further includes forwarding the packet to the second network access controller via an egress network interface.

18 Claims, 5 Drawing Sheets

(56) References Cited

U.S. PATENT DOCUMENTS

| | | | |
|---|---|---|---|
| 2002/0085585 A1* | 7/2002 | Tzeng | H04L 12/5601 370/475 |
| 2005/0025125 A1* | 2/2005 | Kwan | H04L 63/10 370/352 |
| 2005/0055570 A1* | 3/2005 | Kwan | H04L 63/08 726/4 |
| 2005/0147097 A1* | 7/2005 | Chari | H04L 29/12028 370/392 |
| 2009/0067440 A1* | 3/2009 | Chadda | H04L 63/0227 370/401 |
| 2009/0285215 A1* | 11/2009 | Kaippallimalil | H04L 29/12028 370/392 |
| 2013/0305332 A1* | 11/2013 | Narasimhan | H04W 12/04 726/7 |
| 2015/0124826 A1* | 5/2015 | Edsall | H04L 45/66 370/392 |
| 2015/0319089 A1* | 11/2015 | Liu | H04L 45/745 370/392 |
| 2017/0195253 A1* | 7/2017 | Annaluru | H04L 41/0816 |

* cited by examiner

NETWORK SYSTEMS AND ARCHITECTURE FOR SCALING ACCESS NETWORKS WITH NETWORK ACCESS CONTROLLER

CROSS-REFERENCE TO RELATED APPLICATIONS

This application claims the benefit of U.S. Provisional Patent Application No. 62/576,505, filed on Oct. 24, 2017. The disclosure of the above-referenced application is hereby incorporated by reference in its entirety.

TECHNICAL FIELD

Aspects of the present disclosure relate to a network architecture, and more particularly, to a network architecture that uses network access controllers.

BACKGROUND

Client devices (e.g., computing devices such as smartphones, laptop computers, tablet computers, etc.) may communicate with a network via an access point. For example, a tablet computer may communicate with the Internet (e.g., a network) via an access point, such as Wi-Fi access point. One or more network access controllers may provide network policy handling or enforcement functions for the client devices and the access points. For example, a network access controller may control how long a client device is able to access a network or the network bandwidth (e.g., throughput, download speed, upload speed, etc.) for a client device.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Client devices (e.g., computing devices such as smartphones, laptop computers, tablet computers, etc.) may communicate with one or more networks via an access point. For example, a tablet computer may communicate with the Internet (e.g., a network) via an access point, such as Wi-Fi access point. One or more network access controllers may provide network policy handling or enforcement functions for the client devices and the access points. For example, a network access controller may control how long a client device is able to access a network or the network bandwidth (e.g., throughput, download speed, upload speed, etc.) for a client device.

As the number of client devices that access the one or more networks changes, the load on the network access controllers may also change. For example, the number of client devices that are handled by a network access controller may decrease or increase based on the number of client devices that may be using an access point at a given time. It may be difficult to add or remove network controllers dynamically because network access controllers are generally configured to service one or more access points. In addition, due to resource or logistical reasons, different network access controllers may be deployed at different data centers or cloud computing platforms. If network access controllers in one data center fail or are taken offline (e.g., for maintenance), there may be network service disruptions for the client devices that use those network access controllers.

The present disclosure addresses the above-noted and other deficiencies by distributing client devices to different network access controllers. As the number of client devices change (e.g., as the number of client devices increase), the load among the network access controllers may be distributed to prevent a network access controller from being overloaded or underutilized. New network access controllers may be added and existing network access controllers may be removed. The client devices may be distributed among the new or remaining network access controllers.

Figure 1:
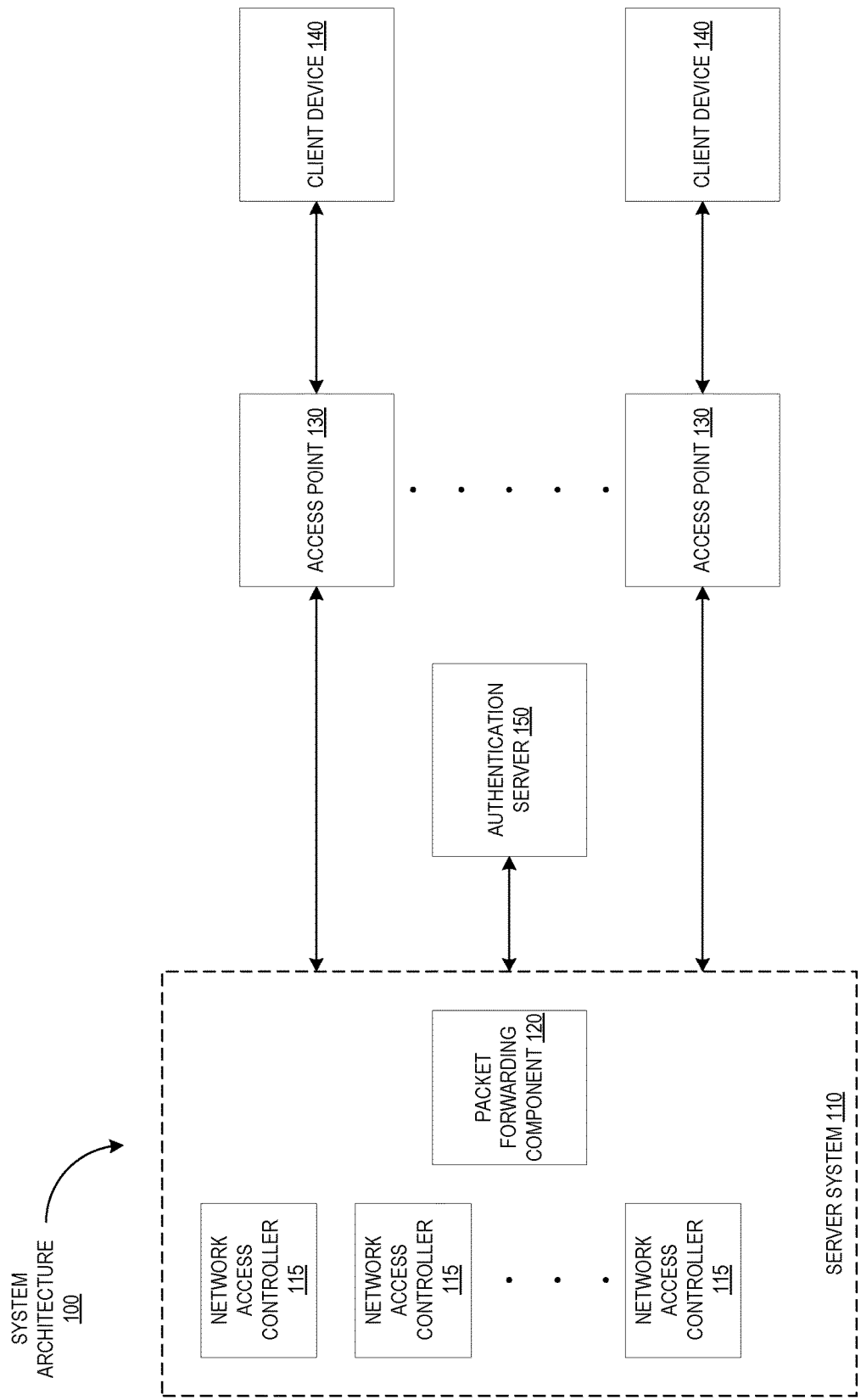
FIG. 1 is a block diagram that illustrates an example system architecture, in accordance with some embodiments of the present disclosure.

FIG. 1 is a block diagram that illustrates an example system architecture 100, in accordance with some embodiments of the present disclosure. The system architecture 200 includes a server system 110, an authentication server 150, access points 130, and computing devices 140. The server system 110, the packet forwarding component 120, the authentication server 150, the access points 130, and the computing devices 140 may be interconnected or coupled to each other (e.g., communicatively coupled) via one or more networks. The one or more networks may carry communications (e.g., data, message, packets, frames, other appropriate types or formats of data, etc.) between the server system 110, the packet forwarding component 120, the authentication server 150, the access points 130, and the computing devices 140. A network may be a public network (e.g., the Internet), a private network (e.g., a local area network (LAN) or wide area network (WAN)), or a combination thereof. In one embodiment, a network may include a wired or a wireless infrastructure, which may be provided by one or more wireless communications systems, such as a wireless fidelity (Wi-Fi) hotspot connected with the network and/or a wireless carrier system that can be implemented using various data processing equipment, communication towers (e.g. cell towers), etc.

A computing device may be a device that may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). A computing device may include any suitable type of device or machine that has a programmable processor including, for example, server computers, desktop computers, laptop computers, tablet computers, smartphones, set-top boxes, etc. In some examples, a computing device may include a single machine or may include multiple interconnected machines (e.g., multiple servers configured in a cluster). Each computing device may execute or include an operating system (OS), as discussed in more detail below. The OS of a computing device may manage the execution of other components (e.g., software, applications, etc.) and/or may manage access to the hardware (e.g., processors, memory, storage devices etc.) of the computing device.

A virtual machine (VM) may be a software implementation of a machine (e.g., a software implementation of a computing device) that includes its own operating system (referred to as a guest OS) and executes application programs, applications, software. A VM may execute on a hypervisor which executes on top of the OS for a computing device (referred to as a host OS). The hypervisor may also be referred to as a virtual machine monitor (VMM). The hypervisor may be a component of an OS for a computing device, may run on top of the OS for a computing device, or may run directly on host hardware without the use of an OS. The hypervisor may manage system resources, including access to hardware devices such as physical processing devices (e.g., processors, CPUs, etc.), physical memory (e.g., RAM), storage device (e.g., HDDs, SSDs), and/or other devices (e.g., sound cards, video cards, etc.). The hypervisor may also emulate the hardware (or other physical resources) which may be used by the VMs to execute software/applications. The hypervisor may also present other software (e.g., "guest" software) the abstraction of one or more virtual machines (VMs). A VM may execute guest software that uses an underlying emulation of the physical resources (e.g., virtual processors and guest memory).

A container may be an isolated set of resources allocated to executing an application, software, and/or process independent from other applications, software, and/or processes. A container may execute on a container engine which executes on top of the OS for a computing device. The host OS (e.g., an OS of the computing device) may use namespaces to isolate the resources of the containers from each other. A container may also be a virtualized object similar to virtual machines. However, a container may not implement separate guest OS (like a VM). The container may share the kernel, libraries, and binaries of the host OS with other containers that are executing on the computing device. The container engine may allow different containers to share the host OS (e.g., the OS kernel, binaries, libraries, etc.) of a computing device. For example, the container engine may multiplex the binaries and/or libraries of the host OS between multiple containers. The container engine may also facilitate interactions between the container and the resources of the computing device. For example, the container engine may manage requests from container to access a memory (e.g., a RAM) of the computing device. In another example, the container engine may manage requests from the container to access certain libraries/binaries of the host OS. The container engine may also be used to create, remove, and manage containers. In one embodiment, the container engine may be a component of a host operating system. In another embodiment, container engine may run on top of a host operating system, or may run directly on host hardware without the use of a host operating system.

In one embodiment, an access point 130 may be a device that is on a boundary between a network service provider (e.g., an internet service provider, a cable service provider, a cellular service providers, etc.) and a consumer (e.g., a user of the client device 140). For example, the access point 130 may be a demarcation between the network boundary of the network service provider and the consumer. In another embodiment, the access point 130 may be consumer premise equipment (CPE). CPE may refer to devices that may be installed or located outside of the network boundary of the network service provider. For example, a CPE may be a wireless router (e.g., a network router) that is installed or located within a user's home.

As illustrated in FIG. 1, the server system 110 includes packet forwarding component 120, and network access controllers 115. Each of the packet forwarding component 120, and network access controllers 115 may be one or more of a computing device, a VM, or a container. The packet forwarding component 120 and network access controllers 115 may also be located on (e.g., may be installed on, may execute on, etc.) one or more of a computing device, a VM, or a container. In one embodiment, the server system 110 may be a data center or cloud computing architecture that includes multiple computing devices, such as server computers. In one embodiment, one of the network access controllers 115 the may be a default network access controller, as discussed in more detail below. For example, the topmost network access controller 115 may be the default network access controller.

In one embodiment, a network access controller (e.g., network access controller 115, etc.) may perform various functions, actions, operations, etc., related to providing the client devices 140 with access to one or more networks (e.g., a private or corporate network, the Internet, public networks such as Wi-Fi networks in airports, coffee shops, trains stations, etc., service provider networks, virtual network operators and carriers, etc.). In one embodiment, a network access controller may authenticate or authorize the client devices 140 or users of the client devices 140. For example, a network access controller may communicate with authentication server 150 to determine whether a user of a client device 140 is allowed to access a network via an access point 130, as discussed in more detail below. In another embodiment, a network access controller may provide network policy handling or enforcement functions. For example, a network access controller may determine the maximum throughput (e.g., maximum download speed) for a user or for a client device 140. In another example, a network access controller may determine the maximum amount or period of time that a user or client device 140 is allowed to access the one or more networks (e.g., a client device 140 may be allowed to access the one or more networks for one hour, one day, or some other appropriate period of time). In a further example, a network access controller may determine whether a user or client device 140 has access to server computers on one or more networks. In one example, a network access controller may also control the types of data that are transmitted or received. For example, the network access controller may prevent video data from being transmitted or received because video data often uses more bandwidth. In some embodiments, a group policy may be used to enforce network policies on a group of users or client devices 140. For example, a group policy may be used to control the download speed, amount of time, etc., for users who are enrolled in a particular subscription plan (e.g., an internet access subscription plan, a cable subscription plan, etc.) that allows the users to access networks via the access points 130.

In one embodiment, the authentication server 150 may include or may be coupled to a data store that includes an authentication table which includes user identifiers (e.g., usernames, logins, email addresses, legal names, etc.) and MAC addresses of network access controllers 115 that are associated with the user identifiers. For example, the authentication server 150 may include an authentication table (or other type of data structure or format) that indicates a MAC address of a network access controller 115 that is associated with each user identifier (e.g., each username) in the table. The authentication table may include a list of all of the user identifiers for all of the users who are allowed to communicate with the one or more networks (e.g., allowed to transmit data to and receive data from the one or more networks). A data store may be one or more devices that may be capable of storing data. Examples of data stores include but are not limited to, optical drives, hard disk drives (HDDs), solid state drives (SSDs), random access memory (RAM), cache, databases, network-attached storage (NAS) drives, portable hard disks, etc.

In one embodiment, a network access controller may encrypt data that is transmitted to the access points 140, and may decrypt data that is received from the access points 140. For example, data transmitted by a server (e.g., a remote server) to a client device 140 may be encrypted before the data is transmitted to the access point 140 to protect the data from unauthorized access by other devices or users. In another example, data transmitted received from a client device 140 may be decrypted before the data is transmitted to one or more networks. In another embodiment, a network access controller may also enforce one or more conditions for allowing users of client devices 140 to access to the one or more networks. For example, the network access controller may not allow a client device 140 to access the one or more networks unless the client device 140 has antivirus software installed.

In one embodiment, each network access controller 115 may instantiate and manage a different internet protocol (IP) subnet. A subnet may be a logical division of an IP network. Different client devices 140 may be part of different subnets based on which network access controller 115 a client device 140 uses. For example, a first client device 140 that uses a first network access controller 115 may be part of a first subnet, a second client device 140 that uses a second network access controller 115 may be part of a second subnet, etc.

As discussed above, a client device 140 may access one or more networks (e.g., the Internet, a private or corporate network, etc.) via an access point 130. For example, the access point 130 may be a wireless access point (e.g., a Wi-Fi access point) located in a store, coffee shop, a building for a company, etc. The access point 130 may be aware of the medium access control (MAC) address of the default network access controller 115. For example, the access point 130 may receive a message with the MAC address of the default network access controller 115 or an administrator may store the MAC address of the default network access controller 115 in a configuration file or parameter. In one embodiment, the access point 140 may receive packets (e.g., messages) from the client device 140. The access point 140 may replace the destination MAC address of the packets with the MAC address of the default network access controller. The access point 140 may replace the destination MAC address to cause the packets to be forwarded to the server system 110, because the default network access controller 115 is located in the server system 110 (e.g., within a data center or cloud computing architecture).

In one embodiment, the packets that are transmitted to the server system 110 may be received by the packet forwarding component 120 before the packets are transmitted (e.g., forwarded) to the network access controllers 115. For example, when a client device 140 transmits a packet to the server system 110, the packet forwarding component 120 may receive the packet first, and may forward the packet to one of the network access controllers 115, as discussed in more detail below.

In one embodiment, a client device 140 or user may be authenticated by the authentication server 150. For example, a client device 140 or user may transmit one or more authentication packets (e.g., one or more packets requesting authentication of the user or client device 140) to the authentication server 150 via an access point 130. The one or more authentication packets may include a user identifier (e.g., username) and password (or some other appropriate authentication information for authenticating a user or client device 140, such as a one-time password, a social security numbers of a user, etc.). The access point 130 may transmit (e.g., forward) the one or more authentication packets to the packet forwarding component 120 and the packet forwarding component 120 may transmit (e.g., forward) the one or more authentication packets to the authentication server 140. The authentication server 150 may authenticate the user identifier and password (or other appropriate information for authentication the user or client device 140), and may allow the client device 140 or the user access to the one or more networks if the user identifier and password are valid. The authentication server 140 may transmit authentication packets that indicate a response to the authentication packets (e.g., the authentication request) received from the client device. For example, the authentication server 140 may transmit a response indicating that the user was successfully authenticated, to the access point 130. The access point 130 may allow the client device 140 to access the one or more networks based on the response.

In one embodiment, the authentication server 140 may include attributes, fields, or parameters in the authentication packets (e.g., the authentication response) transmitted to the client device 140. The attributes may include a user identifier and a MAC address of the network access controller 115 that is associated with the user identifier. The authentication server 140 may obtain the user identifier and the MAC address of the network access controller 115 that is associated with the user identifier based on a table, as discussed above. The authentication server 140 may add the user identifier and the MAC address of the network access controller 115 that is associated with the user identifier prior to transmitting the authentication packets to the client device.

In one embodiment, the authentication server 140 may be a Remote Authentication Dial-In User Service (RADIUS) server and the authentication packets may be RADIUS packets. Although the present disclosure may refer to RADIUS, RADIUS server, or RADIUS packets, other types of authentication servers, authentication protocols, authentication packets, etc., may be used in the system architecture 100.

As discussed above, the packet forwarding component 120 may receive the packets that are transmitted by the client device 140 and may forward the packet to other devices or networks. The packet forwarding component 120 may forward packets between the client device and the authentication server 150. In one embodiment, the packet forwarding component 120 may analyze the authentication packets that are communicated between the client device 140 and the authentication server 140. The authentication packets communicated between the client device 140 may include attributes, fields, parameters, etc., that may indicate one of the one of the network access controllers 115 that should be used for a user. For example, the authentication packets may include attributes, fields, parameters, etc., that indicate a user identifier and the MAC address of a particular network access controller 115 (that should be used to perform the network policy handling or enforcement) for a particular user identified by the user identifier. The packets may also include a MAC address of the client device as a source MAC address when the client 140 transmits the packet.

In one embodiment, the packet forwarding component 120 may store the association between the MAC address of the client device and the MAC address of a particular network access controller 115. For example, the packet forwarding component 120 may store the association between the MAC address of the client device and the MAC address of a particular network access controller 115 in a NAC table. In other embodiments, the NAC table may include an association between the MAC address of the client device, the MAC address of a network access controller 115, and a user identifier of a user (e.g., a user identifier or a user of the client device 140). The NAC table may be stored in a data store that is included in the network access controller 115 or coupled to the network access controller 115.

In some embodiments, the packet forwarding component 120 may obtain the NAC table or may update the NAC table using various other methods, functions, operations, techniques etc. For example, the packet forwarding component 120 may receive the NAC table from another computing device (e.g., another server or a database) in comma separated value (CSV) format or in JavaScript open notation format.

In one embodiment, the packet forwarding component 120 may receive a packet from a client device 140 via an ingress network interface of the packet forwarding component 120 (e.g., via a network port, a network interface, etc.). The packet may be forwarded to the server system 110 by an access point 130 and may be received by the packet forwarding component 120. The packet may include a destination MAC address that is the MAC address of the default network access controller 115 (e.g., is set to the MAC address of the default network access controller 115). The packet may also include a source MAC address that is the MAC address of the client device 140 (e.g., is set to the MAC address of the client device 140).

In one embodiment, the packet forwarding component 120 may access the NAC table (e.g., access data indicating associations between user identifiers and MAC addresses of network access controllers 115) and may determine or identify the MAC address of a network access controller 115 associated with the MAC address of the client device 140. The packet forwarding component 120 may identify which of the network address controllers 115 should receive the packet from the client device 140, based on the MAC address of the network access controller 115 that is associated with the MAC address of the client device 140 (e.g., the source MAC address of the packet transmitted by the client device 140). The packet forwarding component 120 may update (e.g., change, modify) the destination MAC address of the packet from the MAC address of the default network access controller, to the MAC address of the network access controller 115 associated with MAC address of the client device 140, based on the NAC table. The packet forwarding component 120 may then forward the packet to the network access controller 115 that is associated with the MAC address of the client device, via an egress network interface (e.g., via a network port, a network interface, etc.).

In one embodiment, the packet forwarding component 120 may receive a second packet, from a second client device 140, which includes the MAC address of the default network access controller 115 as the destination MAC address. The packet forwarding component 120 may determine or identify the source MAC address of the second packet which may indicate or identify the MAC address of the second client device 140. The packet forwarding component 120 may identify a network access controller 115 associated with the MAC address of the second client device 140 based on the NAC table, as discussed above. The packet forwarding component 120 may update (e.g., change, modify) the destination MAC address of the second packet from the MAC address of the default network access controller to the MAC address of the network access controller 115 that is associated with the MAC address of the second client device 140. The packet forwarding component 120 may forward the second packet to the network access controller 115 that is associated with the MAC address of the second client device 140 (e.g., to a second network access controller).

The packet forwarding component 120 may update the NAC table to reallocate or re-associate client devices 140 with different network access controllers 115 based on different algorithms, functions, parameters, criteria, conditions, etc. For example, the NAC may allocate the client devices 140 to network access controllers 115 based on utilization of the network access controllers 115 (e.g., re-associate client devices 140 with underutilized network access controllers 115). In another example, the packet forwarding component 120 may associate different client devices 140 with different network access controllers 115 based on the alphabetical order of user identifiers for users of the client devices 140. In a further example, the packet forwarding component 120 may associate different client devices 140 with different network access controllers 115 based geographical regions of the client devices 140, based on a user's subscription, or by analyzing the access points 130 used by the client device 130.

In one embodiment, the packet forwarding component 120 may perform load balancing functions for the server system 110. For example, the packet forwarding component 120 may forward packets from different client devices 140 to different network controllers 115 to distribute the packets to different network controllers 115. This may help prevent a network controller 115 from being overloaded, may help prevent a network controller 115 from being underutilized, and may allow for more efficient usage of the network controllers 115. In one embodiment, the packet forwarding component 120 may be referred to as a load balancer. In another embodiment, the packet forwarding component 120 may be referred to as a centralized load balancer because the packet forwarding component 120 may be centrally located in the server system 110 (e.g., in a data center, in a cloud computing architecture, etc.). In one embodiment, the packet forwarding component 220 may forward packets to the same network access controller 230 regardless of which access point 230 a client device 240 is connected to. This may allow for internet protocol (IP) mobility. For example, this may allow the network architecture 200 to keep the client device 240 connected to the same IP subnet while the client device 240 moves (e.g., roams) from one access point 230 to another access point 230. Keeping the client device 240 connected to the same subnet may prevent the disruption or disconnection of network connections or client sessions between the client device 240 an other devices (e.g., server computers, other client devices, etc.).

In one embodiment, the packet forwarding component 120 may also allow network access controllers 115 to be added to or removed from the system architecture 100. For example, a network access controller 115 may be added and client devices 140 that were associated with other network access controllers 115 may be associated with the new network access controller 115. In another example, a network access controller 115 may be removed and the client devices 140 that were associated with the removed network access controller 115 may be associated with the remaining network access controllers 115. Reallocating or re-associating client devices 140 with different network access controllers 115 may allow the network architecture 100 to scale up or scale down based on the number of client devices 140 and access points.

Figure 2:
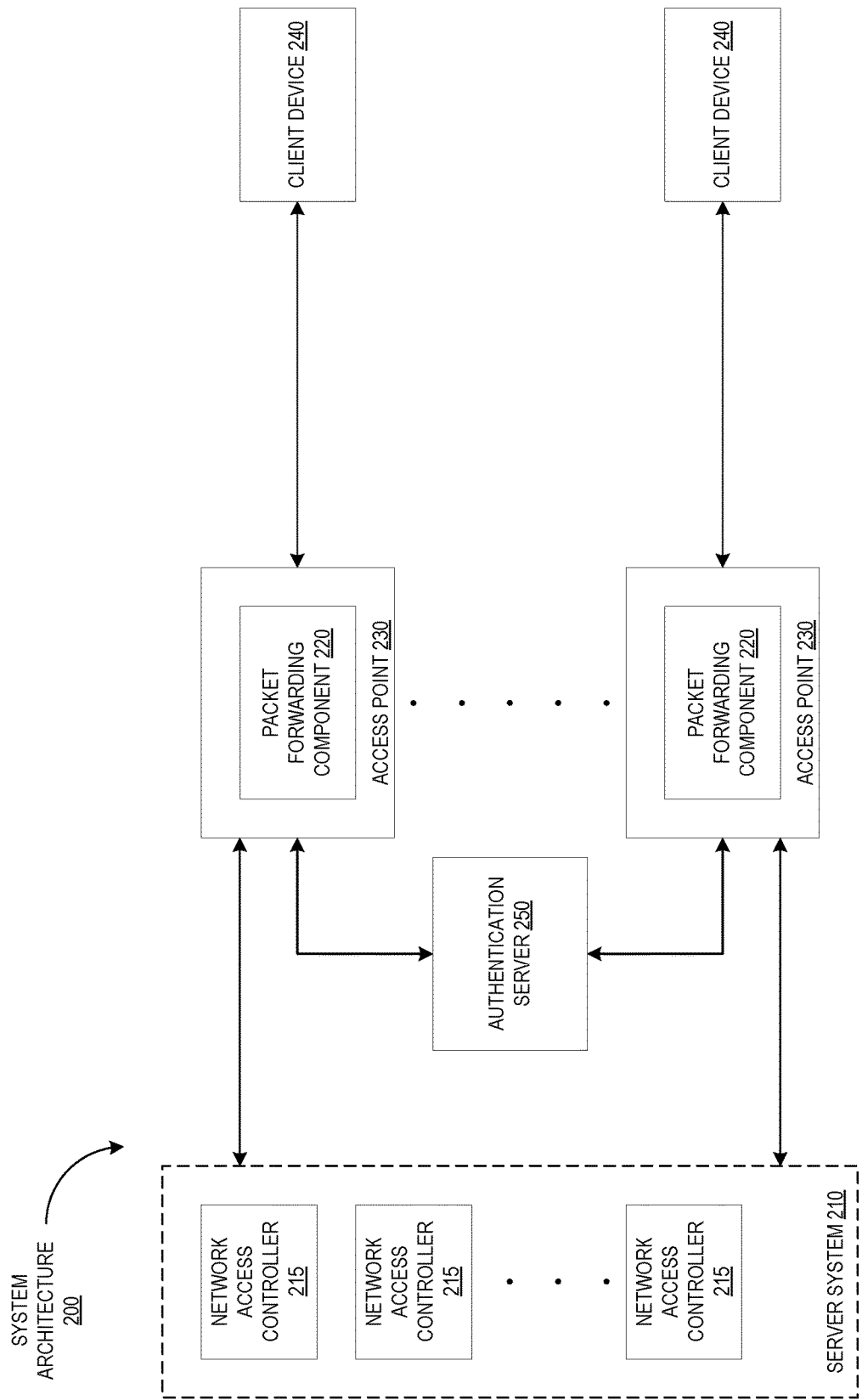
FIG. 2 is a block diagram that illustrates an example system architecture, in accordance with some embodiments of the present disclosure.

FIG. 2 is a block diagram that illustrates an example system architecture 200, in accordance with some embodiments of the present disclosure. The system architecture 200 includes a server system 210, an authentication server 250, access points 230, and computing devices 240. The server system 210, the authentication server 250, the access points 230, and the computing devices 240 may be interconnected or coupled to each other (e.g., communicatively coupled) via one or more networks, as discussed above. The one or more networks may carry communications (e.g., data, message, packets, frames, other appropriate types or formats of data, etc.) between the server system 210, the authentication server 250, the access points 230, and the computing devices 240.

As illustrated in FIG. 2, the server system 210 includes packet forwarding component 220, and network access controllers 215. Each of the network access controllers 215 may be one or more of a computing device, a VM, or a container, as discussed above. In one embodiment, the server system 210 may be a data center or cloud computing architecture that includes multiple computing devices, such as server computers. In one embodiment, one of the network access controllers 215 the may be a default network access controller, as discussed above.

In one embodiment, a network access controller (e.g., network access controller 215, etc.) may perform various functions, actions, operations, etc., related to providing the client devices 240 with access to one or more networks (e.g., a private or corporate network, the Internet, etc.), as discussed above. In one embodiment, a network access controller may encrypt data that is transmitted to the access points 240, and may decrypt data that is received from the access points 240. In another embodiment, a network access controller may also enforce one or more conditions for allowing users of client devices 240 to access to the one or more networks. In some embodiments, each network access controller 215 may instantiate and manage a different IP subnet.

In one embodiment, the authentication server 250 may include or may be coupled to a data store that includes an authentication table that includes user identifiers (and MAC address of network access controllers 215 that are associated with the user identifiers, as discussed above. The authentication table may include a list of all of the user identifiers for all of the users who are allowed to communicate with the one or more networks.

In one embodiment, the packets that are transmitted to the server system 210 may be received by the packet forwarding component 220 before the packets are transmitted (e.g., forwarded) to the network access controllers 215. For example, when a client device 240 transmits a packet to the server system 210, the packet forwarding component 220 may receive the packet first, and may forward the packet to one of the network access controllers 215, as discussed in more detail below.

In one embodiment, a client device 240 or user may be authenticated by the authentication server 250. For example, a client device 240 or user may transmit one or more authentication packets (e.g., one or more packets requesting authentication of the user or client device 240) to the authentication server 250 via an access point 230. The one or more authentication packets may include a user identifier (e.g., username) and password (or some other appropriate information for authenticating a user or client device 240, such as a one-time password, a social security numbers of a user, etc.). The access point 230 may transmit (e.g., forward) the one or more authentication packets to the packet forwarding component 220 and the packet forwarding component 220 may transmit (e.g., forward) the one or more authentication packets to the authentication server 240. The authentication server 250 may authenticate the user identifier and password (or other appropriate information for authentication the user or client device 240), and may allow the client device 240 or the user access to the one or more networks if the user identifier and password are valid. The authentication server 240 may transmit authentication packets that indicate a response to the authentication packets (e.g., the authentication request) received from the client device. For example, the authentication server 240 may transmit a response indicating that the user was successfully authenticated, to the access point 230. The access point 230 may allow the client device 240 to access the one or more networks based on the response.

In one embodiment, the authentication server 240 may include attributes, fields, or parameters in the authentication packets (e.g., the authentication response) transmitted to the client device 240. The attributes may include a user identifier and a MAC address of the network access controller 215 that is associated with the user identifier. The authentication server 240 may obtain the user identifier and the MAC address of the network access controller 215 that is associated with the user identifier based on a table, as discussed above. The authentication server 240 may add the user identifier and the MAC address of the network access controller 215 that is associated with the user identifier prior to transmitting the authentication packets to the client device.

In one embodiment, the authentication server 240 may be a Remote Authentication Dial-In User Service (RADIUS) server and the authentication packets may be RADIUS packets. Although the present disclosure may refer to RADIUS, RADIUS server, or RADIUS packets, other types of authentication servers, authentication protocols, authentication packets may be used in the system architecture 200.

As illustrated in FIG. 2, each access point 230 includes a packet forwarding component 220. The packet forwarding component 220 may receive the packets that are transmitted by the client device 240 and forward the packet to other devices or networks. The packet forwarding component 220 may forward packets between the client device 240 and the authentication server 250. In one embodiment, the packet forwarding component 220 may analyze the attributes, fields, parameters, etc., of authentication packets that are communicated between the client device 240 and the authentication server 240 to identify one of the network access controllers 215 that should be used for a user, as discussed above.

In one embodiment, the packet forwarding component 220 may store the association between the MAC address of the client device and the MAC address of a particular network access controller 215 in a NAC table, as discussed above. In other embodiments, the NAC table may include an association between the MAC address of the client device, the MAC address of a network access controller 215, and a user identifier of a user (e.g., a user identifier or a user of the client device 240).

In some embodiments, the access points 230 may be configured or managed by a management server. The management server may provide the NAC table to the access points 230 as part of the management of the access points 230. For example, the management server may update settings or configurations of the access points 230. The management server may transmit a copy of the NAC table to the access points 130 and the access points 130 may store the NAC table in a data store (e.g., in a memory, a flash memory, etc.).

In one embodiment, the packet forwarding component 220 may receive a packet from a client device 240 and the packet may include a destination MAC address that is the MAC address of the default network access controller 215 (e.g., is set to the MAC address of the default network access controller 215). The packet may also include a source MAC address that is the MAC address of the client device 240 (e.g., is set to the MAC address of the client device 240.

In one embodiment, the packet forwarding component 220 may access the NAC table and may determine or identify the MAC address of a network access controller 215 associated with the MAC address of the client device 240. The packet forwarding component 220 may update the destination MAC address of the packet from the MAC address of the default network access controller, to the MAC address of the network access controller 215 associated with MAC address of the client device 240, based on the NAC table. The packet forwarding component 220 may then forward the packet to network access controller 215 that is associated with the MAC address of the client device.

In one embodiment, the packet forwarding component 220 may receive a second packet, from a second client device 240, which includes the MAC address of the default network access controller 215 as the destination MAC address. The packet forwarding component 220 may determine or identify the source MAC address of the second packet which may indicate or identify the MAC address of the second client device 240. The packet forwarding component 220 may identify a network access controller 215 associated with the MAC address of the second client device 240 based on the NAC table, as discussed above. The packet forwarding component 220 may update (e.g., change, modify) the destination MAC address of the second packet from the MAC address of the default network access controller to the MAC address of the network access controller 215 that is associated with the MAC address of the second client device 240. The packet forwarding component 220 may forward the second packet to the network access controller 215 that is associated with the MAC address of the second client device 240 (e.g., to a second network access controller).

The packet forwarding component 220 may update the NAC table to reallocate or re-associate client devices 240 with different network access controllers 215 based on different algorithms, functions, parameters, criteria, conditions, etc. In one embodiment, the packet forwarding component 220 may perform load balancing functions for the server system 210, as discussed above. This may help prevent a network controller 215 from being overloaded, may help prevent a network controller 215 from being underutilized, and may allow for more efficient usage of the network controllers 215. In one embodiment, the packet forwarding component 120 may be referred to as a load balancer. In another embodiment, the packet forwarding component 120 may be referred to as a decentralized or distributed load balancer because the packet forwarding components 120 are distributed across different access points 230.

In one embodiment, when the packet forwarding component 120 updates the destination MAC address to the MAC address of the network access controller 215 associated with MAC address of the client device 240, the packet forwarding component 120 may help prevent Layer 2 MAC broadcast frames from entering server system 210. This may help the server system 210 by preventing broadcast packets from flooding the server system 210 (or networks included in or coupled to the server system 210). By removing broadcasts the server system 210 may be protected against a type of security vulnerability called address resolution protocol (ARP) Poisoning. For example, the client devices 240 may be protected against ARP poisoning. Also, removing broadcasts may allow the system architecture to scale up to a large number of access points 230 on the same layer 2 (L2) network. For example, thousands, millions, or some other appropriate number of access points 230, may be on the same L2 network when broadcast packets are not used.

Figure 3:
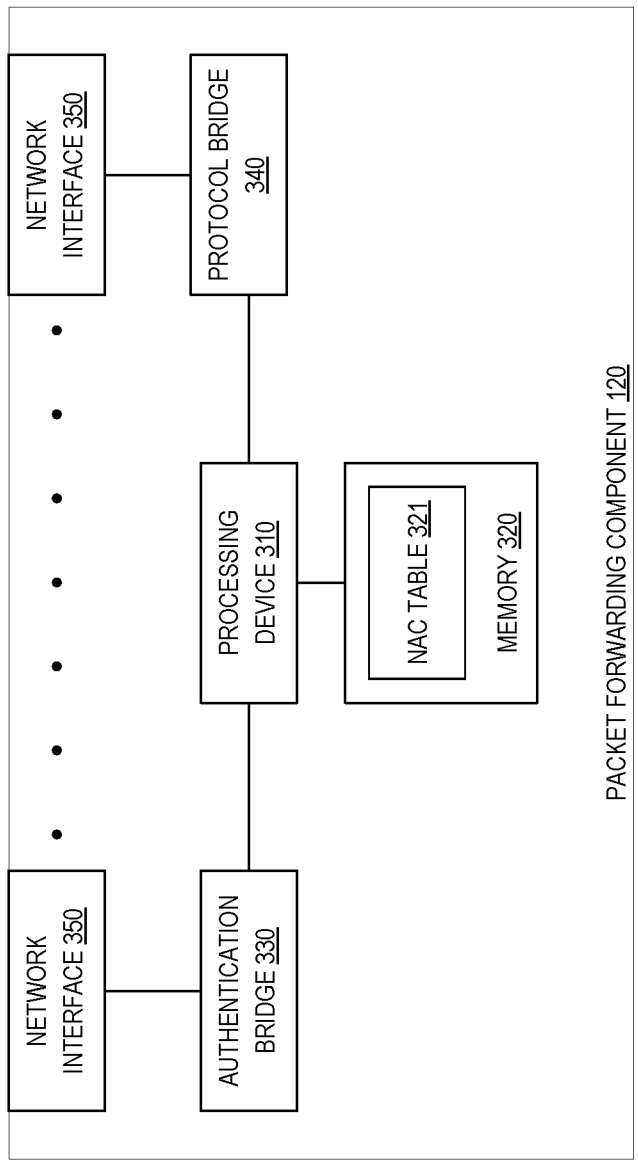
FIG. 3 is a block diagram of an example packet forwarding component, in accordance with some embodiments of the present disclosure.

FIG. 3 is a block diagram of an example packet forwarding component 120, in accordance with some embodiments. The packet forwarding component 120 includes a processing device 310 (e.g., a processor, a central processing unit, a multi-core processors, multiple processors, etc.). The packet forwarding component 120 also includes a memory 320 (e.g., a data store) coupled to the memory 230. The processing device 310 is coupled to the memory 320.

An authentication bridge 330 is coupled to the processing device 310. The authentication bridge 330 may be hardware, firmware, software, or a combination thereof that communicates packets, such as authentication packets with an authentication server (e.g., authentication server 150 illustrated in FIG. 1) via a network interface 350. For example, authentication bridge 330 may include buses, queues, etc., that may be used to communicate packets with the authentication server.

A protocol bridge 340 is coupled to the processing device 310. The protocol bridge 340 may be hardware, firmware, software, or a combination thereof that communicates packets with one or more networks or devices (e.g., computing devices, servers, etc.). For example, the authentication bridge may include buses, queues, etc., that may be used to receive a packet from client device.

The network interfaces 350 may be interfaces or ports that may receive data from or transmit data to one or more networks or devices. In one embodiment, a network interface 350 may be an ingress interface that receives data (e.g., messages, packets, frames, etc.). In another embodiment, a network interface 350 may be an egress interface that transmits data. In a further embodiment, a network interface 350 may be both an egress interface and an ingress interface.

Figure 4:
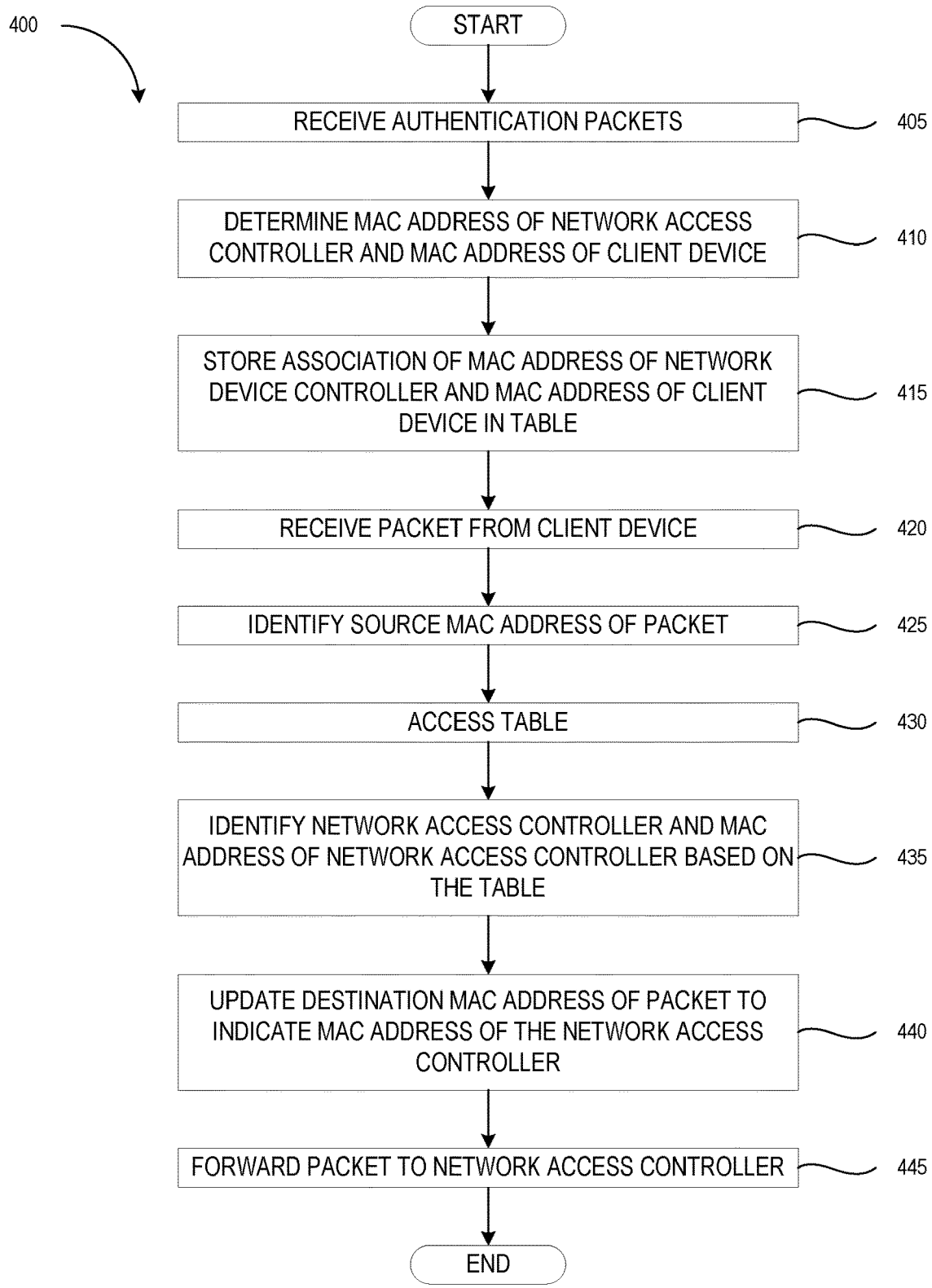
FIG. 4 is a flow diagram of a method of managing resources of a development system, in accordance with some embodiments of the present disclosure.

FIG. 4 is a flow diagram of a method 400 of forwarding a packet in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a packet forwarding component, an access point, and/or a computing device.

The method 400 begins at block 405, where the method 400 may receive authentication packets (e.g., RADIUS packets) from a client device. At block 410, the method 400 may analyze the authentication packets and may determine one or more of user authentication information (e.g., username, password, user identifier, etc.), a MAC address of the client device, and a MAC address of a network access controller that is associated with the MAC address of the client device (e.g., associated with the client device). The method 400 may store an association between the MAC address of the client device and the MAC address of the network access controller in a table at block 415.

At block 420, the method 400 may receive a packet from client device. For example, the client device may transmit a packet to another network or another device. The destination MAC address of the packet may be the MAC address for a default network access controller. The method 400 may identify the source MAC address of the packet at block 425. At blocks 430 ad 435, the method 400 may access the table to identify the network access controller and the MAC address of the network access controller that is associated with the MAC address of the client device, based on the table. At block 440 the method 400 may update the destination MAC address of the packet from the MAC address of the default network controller to the MAC address of the network access controller that is associated with the client device. At block 445, the method 400 may forward the packet to the network access controller that is associated with the client device.

Figure 5:
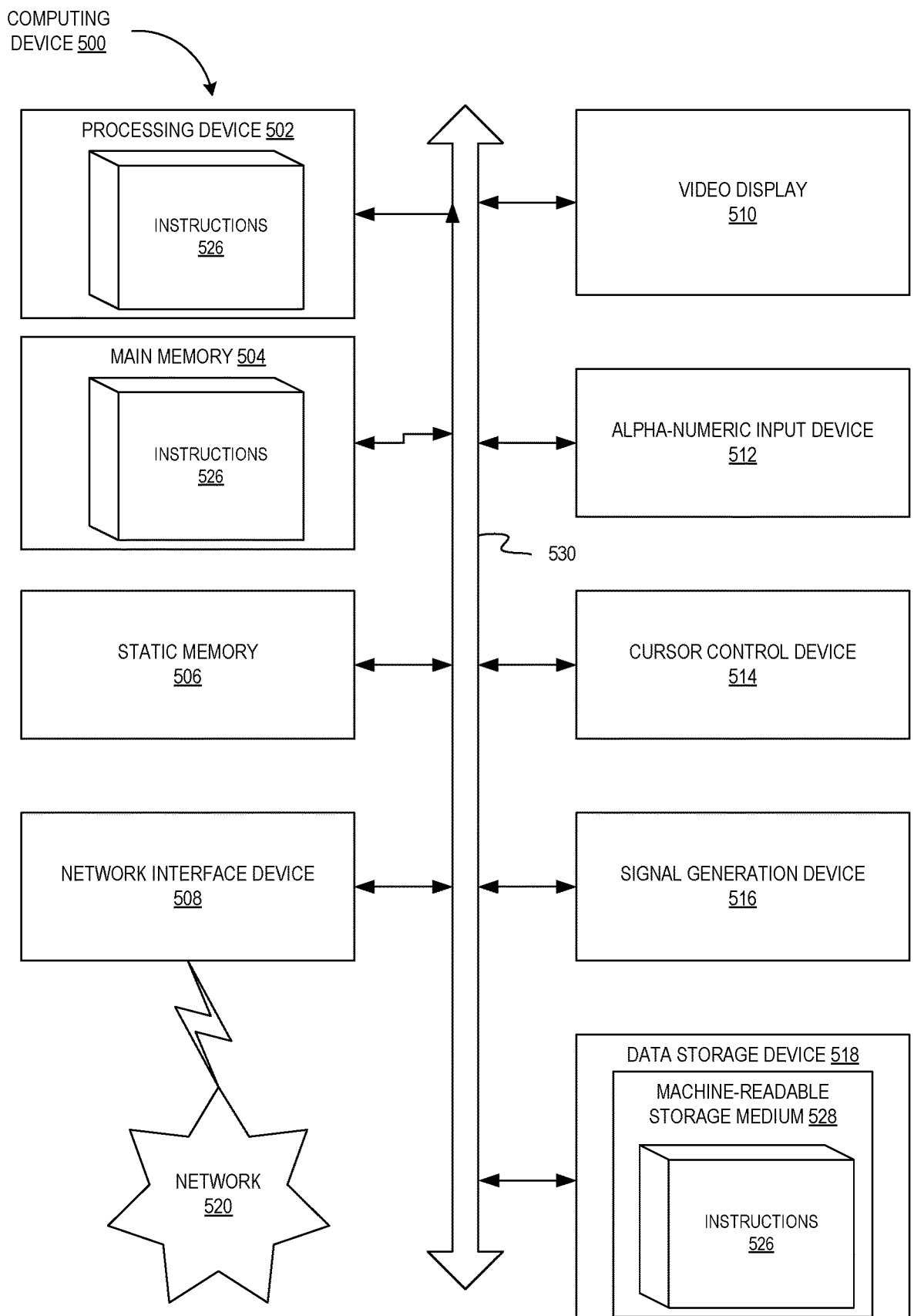
FIG. 5 is a block diagram of an example computing device that may perform one or more of the operations described herein, in accordance with some embodiments of the present disclosure.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein. In some embodiments, the computing device 500 may be one or more of an access point and a packet forwarding component.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions, e.g., instructions for carrying out the operations described herein, in accordance with one or more aspects of the present disclosure. Instructions 526 implementing a packet forwarding component (e.g., packet forwarding components 130 illustrated in FIG. 1 or packet forwarding component 230 illustrated in FIG. 2) may also reside, completely or at least partially, within main memory 504 and/or within processing device 502 during execution thereof by computing device 500, main memory 504 and processing device 502 also constituting computer-readable media. The instructions may further be transmitted or received over a network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "identifying," "updating," "forwarding," "determining," "storing," "accessing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. An apparatus, comprising:
a memory to store packets; and
a packet forwarding component operatively coupled to the memory, the packet forwarding component to:
receive a packet from a client device via an ingress network interface, wherein the packet comprises a first medium access control (MAC) address indicating a default network access controller;
identify a source MAC address of the packet, wherein the source MAC address indicates a second MAC address of the client device;
identify a second network access controller based on the source MAC address and a network access controller (NAC) table, wherein the NAC table associates MAC address of client devices with MAC address of the plurality of network access controllers;
update a destination MAC address to indicate a third MAC address of the second network access controller, wherein the second network access controller enforces network policies for a set of client devices that comprises the client device and wherein the set of client devices communicate with the default network access controller via one or more access point devices; and
forward the packet to the second network access controller via an egress network interface; wherein the packet forwarding component is further to:
receive one or more authentication packets from the client device;
determine user authentication information based on the one or more authentication packets;
determine the MAC address of the client device based on the one or more authentication packets; and
store first data indicating an association between the second MAC address, the user authentication information, and the third MAC address; and
wherein to identify the second network access controller the packet forwarding component is further to:
access the first data;
identify the third MAC address of the second network access controller based on the association of the third MAC address with one or more of the second MAC address or the user authentication information.

2. The apparatus of claim 1, wherein the packet forwarding component is further to:
receive a second packet from a second client device via the ingress network interface, wherein the packet comprises the first medium access control (MAC) address;
identify a second source MAC address of the packet, wherein the second source MAC address indicates a fourth MAC address of the second client device;
identify the second network access controller based on the second source MAC address; update a second destination MAC address to indicate the third MAC address of the second network access controller; and
forward the second packet to the second network access controller via the egress network interface.

3. The apparatus of claim 1, wherein the authentication packets comprise Remote Authentication Dial-In User Service (RADIUS) packets.

4. The apparatus of claim 1, wherein the packet forwarding component comprises the ingress network interface and the egress network interface.

5. The apparatus of claim 1, wherein the packet forwarding component comprises an authentication bridge to communicate the authentication packets with an authentication server and comprises a protocol bridge to process the packet received from the client device.

6. The apparatus of claim 1, wherein the packet forwarding component is located within a data center and wherein one or more of the default network access controller or the second network access controller are located within the data center.

7. The apparatus of claim 1, wherein the apparatus comprises an access point and wherein one or more of the default network access controller or the second network access controller are located within a data center separate from the access point.

8. The apparatus of claim 7, wherein the access point comprises a consumer premise equipment.

9. The apparatus of claim 1, wherein the apparatus comprises a load balancer, within a data center, for a plurality of network access controllers.

10. A method, comprising:
receiving a packet from a client device via an ingress network interface, wherein the packet comprises a first medium access control (MAC) address indicating a default network access controller;
identifying a source MAC address of the packet, wherein the source MAC address indicates a second MAC address of the client device;
identifying a second network access controller based on the source MAC address and a network access controller (NAC) table, wherein the NAC table associates MAC address of client devices with MAC address of the plurality of network access controllers;
updating, by a packet forwarding component, a destination MAC address to indicate a third MAC address of the second network access controller, wherein the second network access controller enforces network policies for a set of client devices that comprises the client device and wherein the set of client devices communicate with the default network access controller via one or more access point devices;
forwarding the packet to the second network access controller via an egress network interface;
receiving one or more authentication packets from the client device;
determining user authentication information based on the one or more authentication packets;
determining the MAC address of the client device based on the one or more authentication packets; and
storing first data indicating an association between the second MAC address, the user authentication information, and the third MAC address;
accessing the first data; and
identifying the third MAC address of the second network access controller based on the association of the third MAC address with one or more of the second MAC address or the user authentication information.

11. The method of claim 10, further comprising:
receiving a second packet from a second client device via the ingress network interface, wherein the packet comprises the first medium access control (MAC) address;
identifying a second source MAC address of the packet, wherein the second source MAC address indicates a fourth MAC address of the second client device;
identifying the second network access controller based on the second source MAC address; updating a second destination MAC address to indicate the third MAC address of the second network access controller; and
forwarding the second packet to the second network access controller via the egress network interface.

12. The method of claim 10, wherein the authentication packets comprise Remote Authentication Dial-In User Service (RADIUS) packets.

13. The method of claim 10, wherein the packet forwarding component comprises the ingress network interface and the egress network interface.

14. The method of claim 10, wherein the packet forwarding component comprises an authentication bridge configured to communicate the authentication packets with an authentication server and comprises a protocol bridge configured to process the packet received from the client device.

15. The method of claim 10, wherein the packet forwarding component is located within a data center and wherein one or more of the default network access controller or the second network access controller are located within the data center.

16. The method of claim 10, wherein the packet forwarding component is located within an access point and wherein or more of the default network access controller or the second network access controller are located within a data center separate from the access point.

17. The method of claim 10, wherein the access point comprises a consumer premise equipment.

18. The method of claim 10, wherein the packet forwarding component comprises a load balancer for a plurality of network access controllers.

* * * * *